(12) United States Patent
Bock et al.

(10) Patent No.: US 6,609,409 B1
(45) Date of Patent: Aug. 26, 2003

(54) IMPACT TEST STAND FOR VEHICLE COMPONENTS

(75) Inventors: Heinz Bock, Heubach (DE); Armin Dworschak, Schwäbisch Gmünd (DE); Bernd Herkommer, Waldstetten (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/594,073

(22) Filed: Jun. 14, 2000

(30) Foreign Application Priority Data

Jun. 15, 1999 (DE) .................... 299 10 483 U

(51) Int. Cl.⁷ .............................. B01P 15/00
(52) U.S. Cl. ................................ 73/12.01
(58) Field of Search .................. 73/12.01, 12.04, 73/12.06, 12.07, 12.09, 12.08, 12.13

(56) References Cited

U.S. PATENT DOCUMENTS

| 5,483,845 | A | * | 1/1996 | Stein et al. | ................. 73/12.04 |
| 5,485,758 | A | * | 1/1996 | Brown et al. | ............... 73/12.04 |
| 5,623,094 | A | * | 4/1997 | Song et al. | ................. 73/12.07 |
| 5,929,348 | A | * | 7/1999 | Stein et al. | ................. 73/865.3 |
| 6,035,728 | A | * | 3/2000 | Jost | ............................ 73/865.3 |
| 6,178,805 | B1 | * | 1/2001 | Kosaraju et al. | ........... 73/12.04 |

FOREIGN PATENT DOCUMENTS

DE       3127910       1/1983

OTHER PUBLICATIONS

Lang, W.: Simulation Schwerer Auffahrunfälle mit Einer elektro–hydraulischen Katapultanlage Atz 72 (1970) 5 (pp. 162–167).

Laurick, Wolfgang, Werner, Helmut: Prüfung und Berwertung von Sicherheitsgurten Durch Umfallsimulation mit einem Horizontalschlitten. Atz 87, 1985 (pp. 109–118).

* cited by examiner

Primary Examiner—Hezron Williams
Assistant Examiner—Anore Allen
(74) Attorney, Agent, or Firm—Tarolli, Sundheim, Covell & Tummino L.L.P.

(57) ABSTRACT

An impact test stand for vehicle components, such as interior parts, operating parts and components of an occupant restraint system includes a stationary frame and an impact body. The impact body is mounted on a carriage. The carriage is guided by a guide track and driven by a linear drive. By accelerating the carriage, the impact body is driven against the component to be tested.

2 Claims, 2 Drawing Sheets

IMPACT TEST STAND FOR VEHICLE COMPONENTS

The present invention relates to an impact test stand for vehicle components and, in particular, for occupant restraint components.

BACKGROUND OF THE INVENTION

In modern vehicles, occupant restraint systems of the most varied kind are used. In addition to belt systems with or without belt tensioners, this includes in particular inflatable protective cushions, paddings, bolsters, linings and operating parts which are deformable in an energy-absorbing manner. To optimize the protective effect, the various components of occupant restraint systems are subjected to extensive tests. Also to ensure a uniform quality in mass production, regular tests are necessary.

In order to detect all parameters which are important for the protective effect, on testing, complicated dynamic tests are necessary, which are currently carried out as so-called sliding carriage tests or real crash tests. In a sliding carriage test, a vehicle body or vehicle mock-up with the restraint system installed therein and a dummy are accelerated to a defined impact speed and driven against a defined obstacle by means of an acceleration sliding carriage. By means of sensors of the most varied kind, all the parameters which are of interest can be derived, during the impact process.

Sliding carriage tests of this type are in fact very costly, but are regarded as being necessary because the typical impact scenarios can be realistically simulated with them.

SUMMARY OF THE INVENTION

The present invention provides an impact test stand for the dynamic testing of vehicle components, in particular of components of an occupant restraint system, which enables a drastically reduced expenditure compared with sliding carriage tests, nevertheless providing a realistic simulation of impact scenarios and interactions. According to the invention, the vehicle component which is to be tested is mounted and arranged on a fixed stand, and an impact body is moved on a guide track against the component. In the impact test stand according to the invention, the vehicle component which is to be tested is held stationary, and only the impact body is moved. The impact body is representative of the shape and mass of an occupant striking on the vehicle component. By variation of mass, size and shape of the impact body, a sufficiently realistic simulation of the most frequent impact scenarios is possible.

With the test stand according to the invention, the most important functions of active restraint systems and energy-absorbing elements can be tested. In the case of inflatable protective cushions, the following can be tested in particular:

The strength of the covering of the protective cushion;

controlled outflow behavior through outflow openings or gas-permeable wall of the envelope of the protective cushion;

various tether arrangements;

various gas bag folding types;

restraint effect as a function of the compressed gas source used, e.g. a multiple-stage gas generator.

In addition, with the impact test stand according to the invention, the most varied vehicle parts can be tested as regards their energy-absorbing behavior, in particular:

steering wheels with integrated airbags;

knee cushions;

vehicle interior parts;

variants in construction and material to optimize energy dissipation.

Finally, also, basic investigation is possible regarding critical relative positions between occupants and restraint systems (OOP for Out of Position):

hit tests on various simulation arrangements (head, trunk or other body parts);

determinination of hit energy;

testing various gas bag volumes;

appraisal of various fold techniques and tether arrangements.

In the preferred embodiment of the impact test stand according to the invention, the impact body is secured in an interchangeable manner on the free end of a guide rod, which in turn is guided so as to be freely displaceable linearly in a driven sliding carriage. The sliding carriage, which is driven on an acceleration track, takes with it the impact body with guide rod, until it is braked against a stop after reaching the given speed. The impact body and guide rod are now moved further by their mass inertia and are uncoupled from the sliding carriage, so that the impact body is moved independently of the braking of the sliding carriage against the component which is to be tested, and strikes it. Through a number of suitable sensors, all the relevant parameters are detected during the impact process and are passed on to a pickup- and evaluation system.

When the component which is to be tested is an active system such as an inflatable protective cushion, activation of this system is ensured by a further sensor which detects the movement of the impact body, the travel distance and the spacing from the component which is to be tested.

BRIEF DESCRIPTION OF THE DRAWINGS

Further features and advantages of the invention will become apparent from the following description and from the drawings, to which reference is made. In the drawings.

DETAILED DESCRIPTION OF INVENTION

Figure 1:
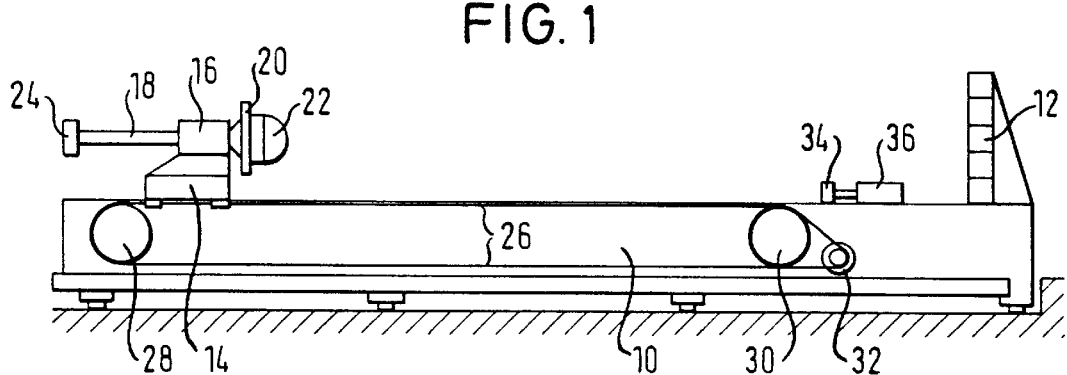
FIGS. 1, 2 and 3 show side views of the test stand in the state of rest, in the acceleration state and after acceleration of an impact body.

The test stand, shown diagrammatically in FIG. 1, for vehicle components such as interior parts, operating parts and components of an occupant restraint system, consists substantially of an acceleration track 10, a fixed stand 12 at one end of the acceleration track 10 and a driven sliding carriage 14, which is movable on the acceleration track 10. A guide trestle 16 is mounted on the sliding carriage 14. The guide trestle 16 has a linear guide for a guide rod 18. The guide rod 18, which is arranged so as to be freely displaceable in this linear guide, carries at its end facing the frame 12 a holder 20 on which an impact body 22 is fastened so as to be interchangeable, and at its other end it carries a stop 24. The sliding carriage 14 is coupled to a drive member, 26, in particular a belt, chain or cable, which runs over two deflector rollers 28, 30. The deflector roller 30 is driven by a servo-motor 32. A stop 34 for the sliding carriage 14 is arranged immediately behind the deflector roller 30. The stop 34 is supported via a damping cylinder 36 against the structure of the acceleration track 10.

FIG. 1 shows the sliding carriage 14 with the impact body 22 in an initial position at the end of the acceleration track 10 facing away from the frame 12. To carry out a test, the sliding carriage 14 is accelerated by the servo-motor 22 onto the frame 12, on which a vehicle component, to be tested is arranged and supported in a manner which is to be described in further detail.

Figure 2:
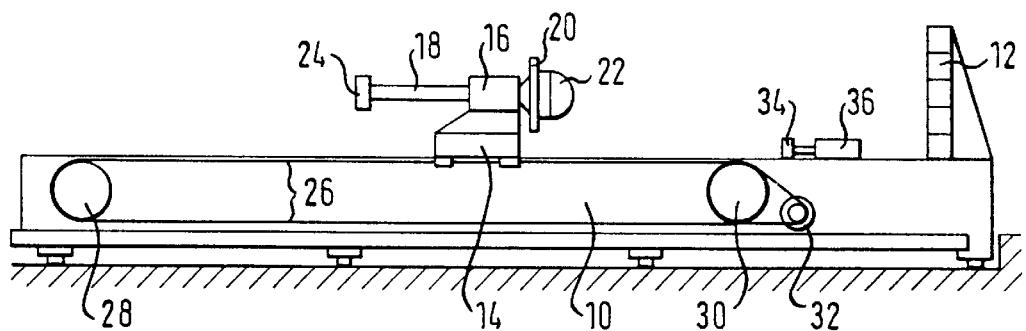
Figure 3:
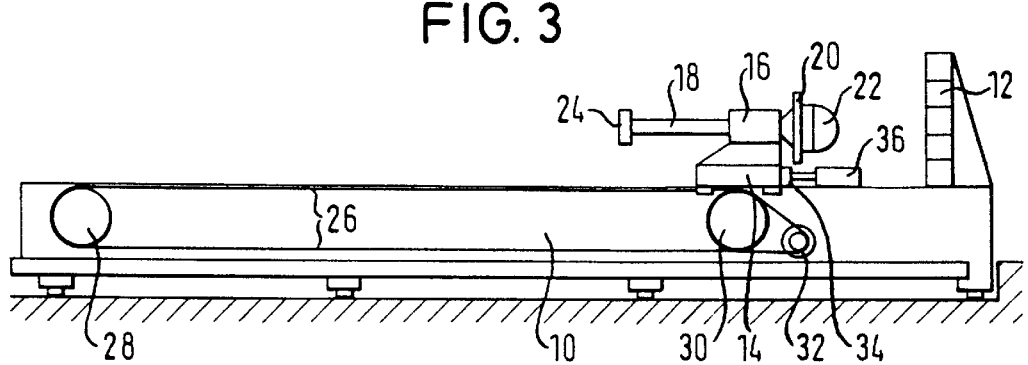

FIG. 2 shows the sliding carriage 14 approximately in the middle of the acceleration track 10. On acceleration, the holder 20 is entrained with impact body 22 and guide rod 18, the holding 20 being pressed in abutment at the guide trestle 16. At the end of the acceleration track 10 (FIG. 3), the sliding carriage 14 is uncoupled from the drive member 26 and travels against the stop 34, which owing to its support by means of the damping cylinder 36 yields in an energy-absorbing manner. The impact body 22 with holder 20 and the guide rod 18 which is freely displaceable in the guide trestle 16, however, moves by mass inertia independently of the braking of the sliding carriage 14 further towards the frame 12. The impact body 22 is therefore coupled in the acceleration phase to the sliding carriage 14, however during the braking of the sliding carriage it is uncoupled therefrom kinematically.

Figure 4:
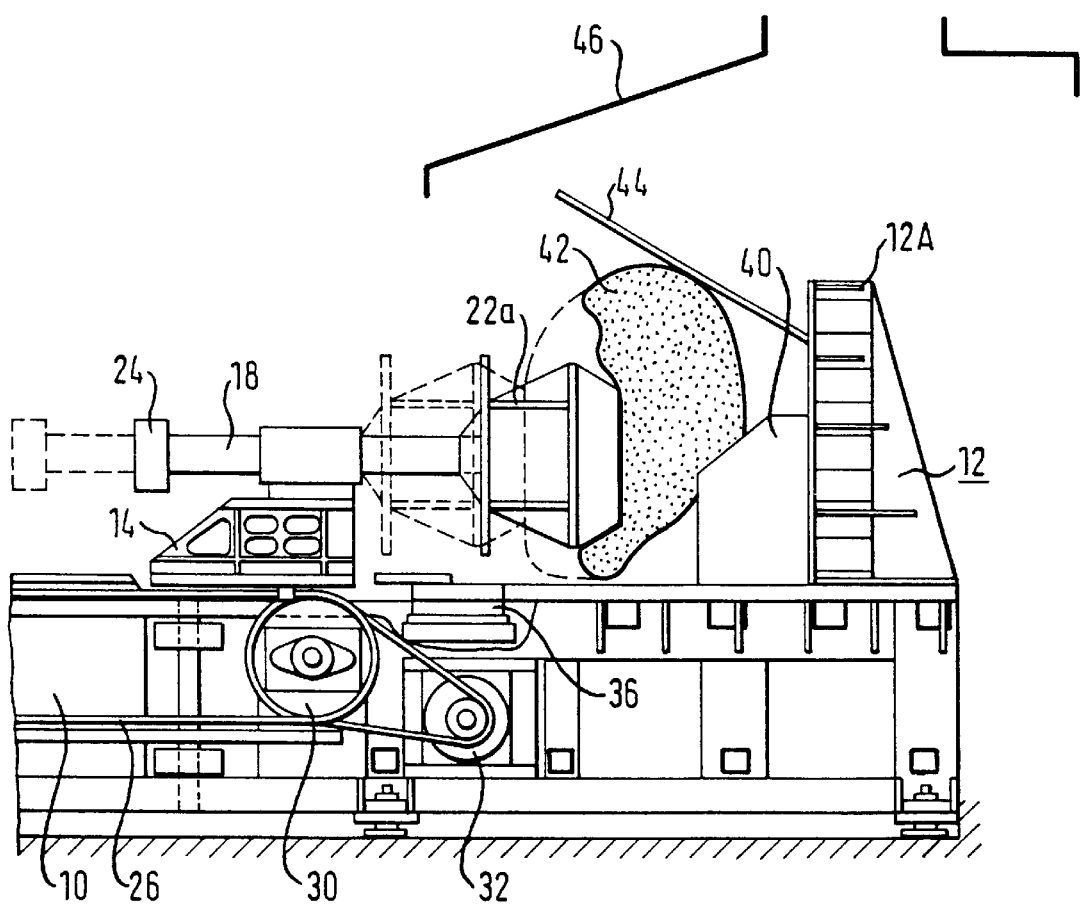
FIG. 4 shows an enlarged side view of the test stand on impact of the impact body on an inflatable protective cushion.

The last phase of the impact test is illustrated in detail in FIG. 4. A component of the frame 12 is a mounting wall 12A, on which the vehicle part which is to be tested is arranged and fastened. In particular for the test shown, an active component 40 of an occupant restraint system is installed on the mounting wall 12A. It contains a gas generator and a gas bag 42 which is inflatable thereby, which is illustrated in the activated state in FIG. 4. The activation takes place by igniting the gas generator at a moment which is determined by the movement of the impact body 22a, for example by the latter actuating a proximity switch. For each test, the suitable impact body is selected. The impact body 22a shown in FIG. 4 is different from the impact body 22 shown in FIGS. 1 to 3. The position of the impact body 22a shown in dotted lines in FIG. 4 corresponds substantially to that of the impact body 22 in FIG. 3. Following this, the impact body 22a moves further and penetrates into the inflated gas bag 42. In this impact test, all the parameters which are of interest are detected by a range of sensors (not illustrated), in particular:

The deceleration of the impact body, from which the covered distance and the speed function can be determined by computation;

the time-dependent function of the gas bag internal pressure;

the exact moment of ignition of the gas generator;

the reaction forces on the stationary frame.

The entire process is preferably recorded in addition by a high speed camera.

The stop 24 at the end of the guide rod 18 prevents the impact body 22a from penetrating the gas bag 42 and causing destruction on the stationary frame 12. As the stop 24 in this case strikes against the bearing block 16 which is connected with the sliding carriage 14, which in turn is in abutment at the stop 34, the movement of the impact body is finally braked in a controlled manner by the damping cylinder 36.

Depending on the type of vehicle parts which are to be tested, the test stand is equipped with additional arrangements. In FIG. 4, by way of example, an obliquely inclined protective wall 44 is shown, by which the expansion of the gas bag 42 is delimited upwards, in a similar manner to a windscreen in the vehicle. In addition, a hood 46 is shown diagrammatically, which is connected to a suction installation, in order to draw off any toxic gases which are released by pyrotechnic gas generators.

What is claimed is:

1. An impact test stand for vehicle components comprising a permanently stationary frame, mounting means for mounting on said stationary frame a vehicle component to be tested, a linear guide track having a first end adjacent said stationary frame and a second end remote from said stationary frame, a carriage movable on said guide track relative to said stationary frame, an impact body simulating a vehicle occupant mounted on said carriage, driving means for driving said carriage towards said stationary frame to move said impact body against a vehicle component mounted on said stationary frame in a position exposed to said impact body, and a release system that detects approximation of said impact body against said vehicle component to be tested and provides a release signal to said component when said impact body moves toward said component in excess of a predetermined distance from said component.

2. An impact test stand for vehicle components comprising a permanently stationary frame, mounting means for mounting on said stationary frame a vehicle component to be tested, a linear guide track having a first end adjacent said stationary frame and a second end remote from said stationary frame, a carriage movable on said guide track relative to said stationary frame, an impact body simulating a vehicle occupant mounted on said carriage, and driving means for driving said carriage towards said stationary frame to move said impact body against a vehicle component mounted on said stationary frame in a position exposed to said impact body, wherein said vehicle component is an inflatable restraint, and further including sensing means for detecting during penetration of the impact body into the inflatable restraint at least one of the following parameters:

internal pressure within the inflatable restraint deceleration of said impact body.

* * * * *